US012602821B2

(12) United States Patent
Takahashi

(10) Patent No.: US 12,602,821 B2
(45) Date of Patent: Apr. 14, 2026

(54) IMAGING DEVICE FOR CALCULATING THREE-DIMENSIONAL POSITION ON THE BASIS OF IMAGE CAPTURED BY VISUAL SENSOR

(71) Applicant: FANUC CORPORATION, Yamanashi (JP)

(72) Inventor: Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 18/552,899

(22) PCT Filed: May 20, 2021

(86) PCT No.: PCT/JP2021/019252
§ 371 (c)(1),
(2) Date: Sep. 28, 2023

(87) PCT Pub. No.: WO2022/244212
PCT Pub. Date: Nov. 24, 2022

(65) Prior Publication Data
US 2024/0185455 A1    Jun. 6, 2024

(51) Int. Cl.
G06T 7/73        (2017.01)
G06T 7/571        (2017.01)
H04N 23/67        (2023.01)
H04N 23/695        (2023.01)

(52) U.S. Cl.
CPC .............. G06T 7/73 (2017.01); G06T 7/571 (2017.01); H04N 23/675 (2023.01); H04N 23/695 (2023.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 7,084,900 | B1 * | 8/2006 | Watanabe | G06T 7/75 |
| | | | | 348/94 |
| 2012/0229628 | A1 * | 9/2012 | Ishiyama | H04N 13/239 |
| | | | | 348/135 |
| 2013/0301909 | A1 * | 11/2013 | Sato | G01B 11/25 |
| | | | | 382/154 |
| 2015/0215607 | A1 | 7/2015 | Chou et al. | |
| 2016/0356596 | A1 * | 12/2016 | Kitamura | G01B 11/254 |

(Continued)

FOREIGN PATENT DOCUMENTS

| | | |
|---|---|---|
| JP | 2000-293695 A | 10/2000 |
| JP | 2001-257932 A | 9/2001 |

(Continued)

*Primary Examiner* — Stefan Gadomski
(74) *Attorney, Agent, or Firm* — HAUPTMAN HAM, LLP

(57) ABSTRACT

This imaging device comprises a focus position detection unit for detecting a focus position when a visual sensor is in focus. The imaging device comprises a parameter setting unit for setting a parameter for calculating a three-dimensional position corresponding to a specific position in an image captured by the visual sensor. The imaging device comprises a characteristic position calculation unit for calculating the three-dimensional position of a characteristic portion using the parameter set by the parameter setting unit. The parameter setting unit sets the parameter on the basis of the focus position.

7 Claims, 12 Drawing Sheets

(56)                    References Cited

U.S. PATENT DOCUMENTS

| | | | |
|---|---|---|---|
| 2019/0297249 | A1 | 9/2019 | Kim et al. |
| 2019/0386064 | A1* | 12/2019 | Valouch .................. H10K 39/30 |
| 2020/0267309 | A1 | 8/2020 | Feng et al. |
| 2022/0401178 | A1* | 12/2022 | Polchin .................. A61B 34/20 |
| 2023/0298231 | A1* | 9/2023 | Schleyer .............. A61B 6/5282 |
| | | | 600/411 |

FOREIGN PATENT DOCUMENTS

| | | | |
|---|---|---|---|
| JP | 2008241491 | A | 10/2008 |
| JP | 2016-070674 | A | 5/2016 |
| JP | 2020-185639 | A | 11/2020 |
| TW | 201530243 | A | 8/2015 |
| WO | 2011/058876 | A1 | 5/2011 |
| WO | 2017146202 | A1 | 8/2017 |

* cited by examiner

FIG. 2

IMAGING DEVICE FOR CALCULATING THREE-DIMENSIONAL POSITION ON THE BASIS OF IMAGE CAPTURED BY VISUAL SENSOR

RELATED APPLICATIONS

The present application is a National Phase of International Application No. PCT/JP2021/019252 filed May 20, 2021.

TECHNICAL FIELD

The present invention relates to an imaging device that calculates a three-dimensional position based on an image captured by a vision sensor.

BACKGROUND ART

A device that detects a three-dimensional position of a target object by processing an image obtained by imaging the target object with a vision sensor is known in the conventional art. For example, a device that captures two-dimensional images of a target object from two directions and calculates the three-dimensional position of a specific portion thereof is known (for example, Japanese Unexamined Patent Publication No 2016-706475A). Alternatively, it is known that a vision sensor called a stereo camera simultaneously captures images with two two-dimensional cameras and calculates the three-dimensional position of a feature point based on the parallax between the two images.

Such a device that calculates a three-dimensional position can be attached to a robot for moving an operation tool that performs predetermined operation. In a robot system that transports a workpiece, a camera captures images of the workpiece placed at a predetermined position. The three-dimensional position of the workpiece is detected based on an image captured by the camera. The position and orientation of the robot are changed such that the workpiece can be gripped in response to the position of the workpiece. With such control, an accurate position of the workpiece can be detected and the operation can be reliably performed.

When the three-dimensional position of a target object is calculated based on a two-dimensional image captured by a vision sensor, a calculation model for transforming a position in an image into a three-dimensional position is used. The calculation model includes predetermined parameters such as coefficients and constants. Using the calculation model, the three-dimensional position can be calculated from the position in the image captured by the camera.

CITATION LIST

Patent Literature

[PTL 1]: Japanese Unexamined Patent Publication No 2016-70674 A

SUMMARY OF THE INVENTION

Technical Problem

The parameters of the calculation model for calculating the three-dimensional position of the target object depend on conditions under which the camera is installed, the characteristics of lenses, the individual differences of the lenses, and the like. Parameters can be predetermined by calculation, experiment, or the like. For example, parameters can be calculated in advance by actually capturing an image of the target object after the camera is placed at a predetermined position.

In a combination of a camera body and lenses in the conventional art, the camera is fixed at a predetermined position for use. The positions of the lenses of the camera are fixed and parameters are calculated in advance and used. However, target objects that are imaged by the camera may have individual differences. Alternatively, the position of a target object may be displaced from a desired position when it is imaged by the camera. As a result, the image may be blurred when a workpiece is imaged.

Thus, control for focusing the camera is conceivable. For example, in the case of a camera having an autofocus function, it is conceivable that the camera is focused in response to the position where a workpiece is placed or individual differences of the workpiece. However, when focusing is performed, the position of the lens which is focused changes and thus parameters of the calculation model also change. Because parameters are determined corresponding to one focus position, there is a problem that it is not possible to focus on a position other than the predetermined focus position. Alternatively, it is necessary to use parameters without taking the focus position into account.

Also, in order to keep the focus position constant, it is conceivable that the relative position of the camera with respect to the workpiece is aligned with a predetermined position. However, the position of at least one selected from among the workpiece and the camera may change. For example, the position and orientation of a workpiece placed on a workbench may change in response to conditions under which the workpiece is transported. In this case, the robot can change in position and orientation in response to the position and orientation of the workpiece. However, the robot may interfere with obstacles such as fences placed around the robot system. Alternatively, the stroke of the robot may be limited. Therefore, it may be difficult to align the relative position of the camera with respect to the workpiece with a predetermined position.

Solution to Problem

An imaging device of an aspect of the present disclosure includes a vision sensor configured to capture an image of a target object and a focus position detecting unit configured to detect a focus position where the vision sensor is focused. The imaging device includes a parameter setting unit configured to set a parameter for calculating a three-dimensional position corresponding to a specific position in the image captured by the vision sensor. The imaging device includes a storage part configured to store setting information for setting the parameter corresponding to the focus position. The imaging device includes a feature detecting unit configured to detect a predetermined feature portion in the image of the target object and a feature position calculating unit configured to calculate the three-dimensional position of the feature portion by using the parameter set by the parameter setting unit. The parameter setting unit is configured to set the parameter based on the focus position and the setting information.

Advantageous Effect of Invention

According to the aspect of the present disclosure, it is possible to provide an imaging device that accurately detects the three-dimensional position of the feature portion when the focus position changes.

BRIEF DESCRIPTION OF DRAWINGS

FIG. 2 is a block diagram of the first robot system according to the embodiment.

DESCRIPTION OF EMBODIMENTS

An imaging device according to an embodiment will be described with reference to FIG. 1 to FIG. 12. The imaging device of the present embodiment functions as a three-dimensional position acquisition device that calculates the three-dimensional position of a specific position in an image based on the image captured by a vision sensor.

Figure 1:
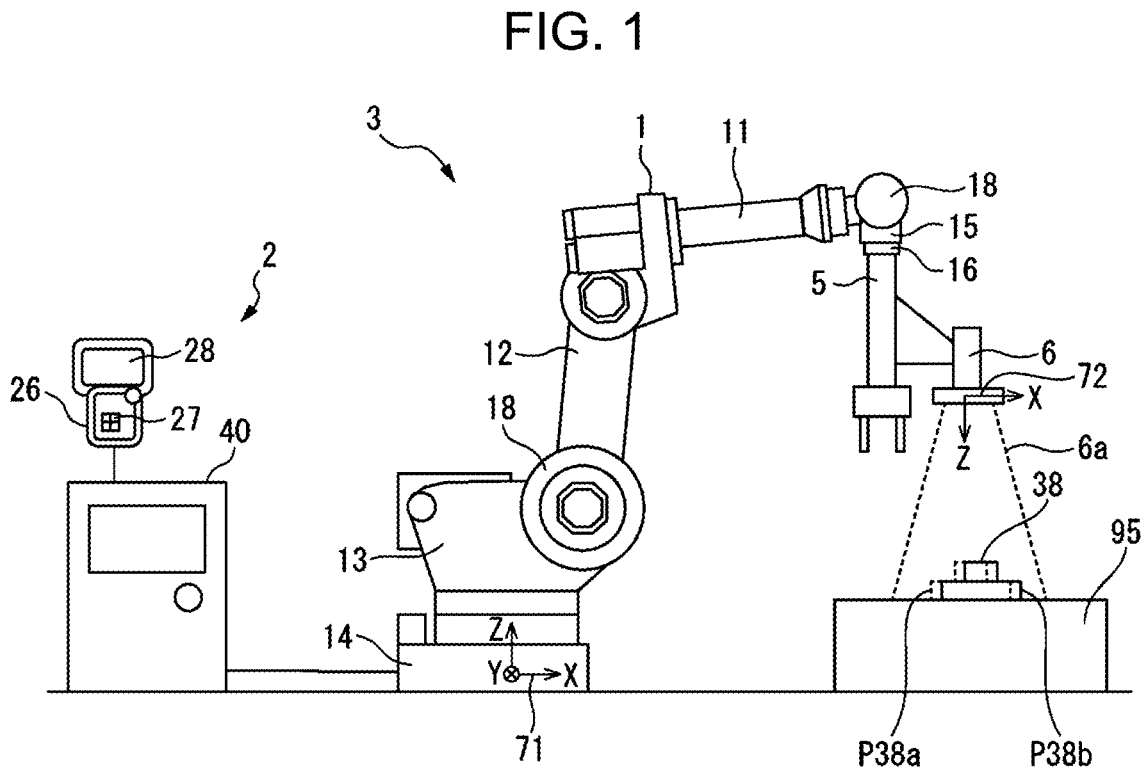
FIG. 1 is a schematic diagram of a first robot system according to an embodiment.
Figure 2:
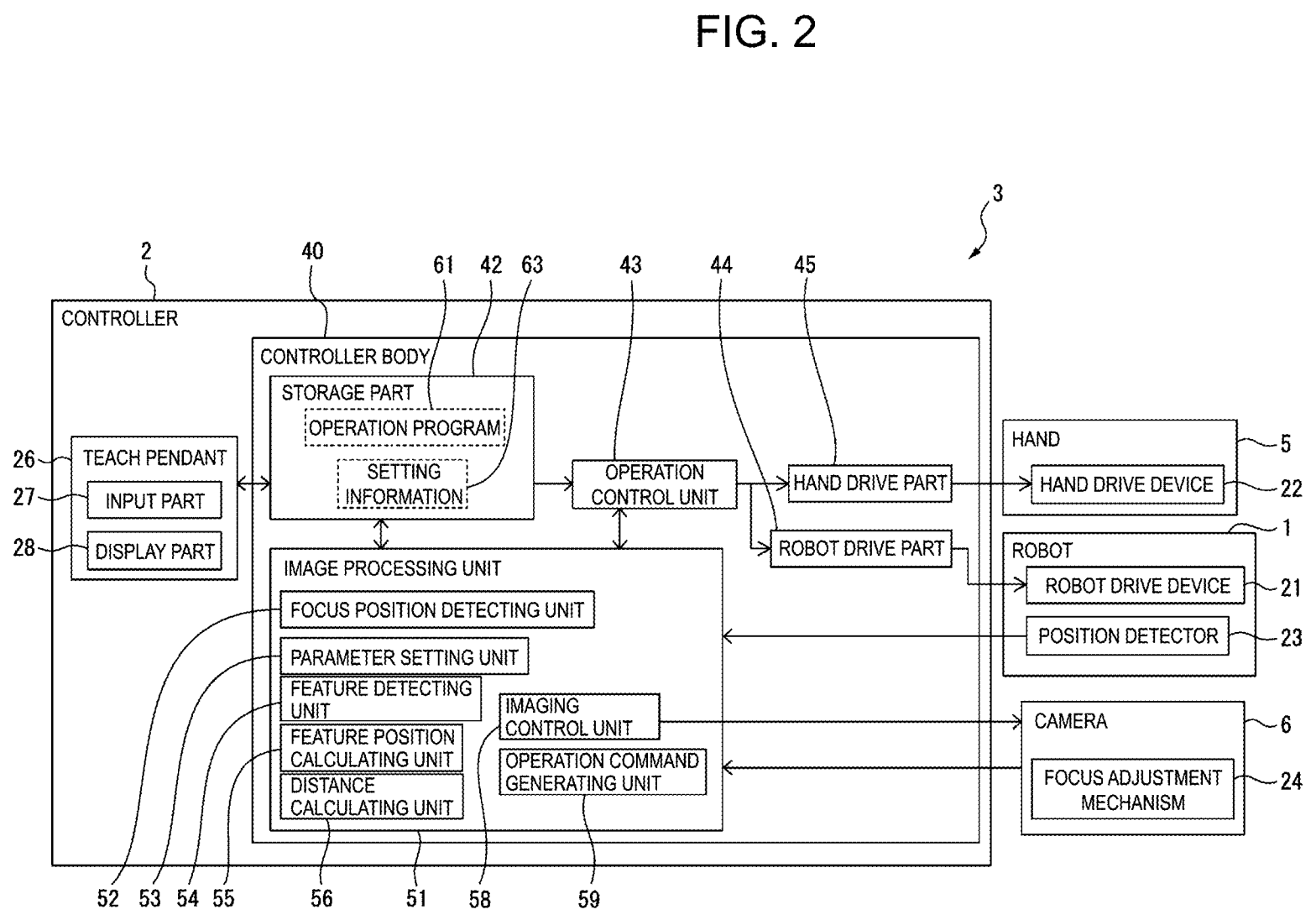

FIG. 1 is a schematic diagram of a first robot system including an imaging device according to the present embodiment. FIG. 2 is a block diagram of the first robot system according to the present embodiment. The robot system of the present embodiment detects the position of a workpiece serving as a target object and transports the workpiece.

Referring to FIG. 1 and FIG. 2, the first robot system 3 includes a hand 5 serving as an operation tool that grips a workpiece 38 and a robot 1 that moves the hand 5. The robot system 3 includes a controller 2 that controls the robot system 3. The robot system 3 also includes a pedestal 95 on which the workpiece 38 is placed.

The hand 5 of the present embodiment is an operation tool that grips and releases the workpiece 38. The operation tool attached to the robot 1 is not limited to this form and any operation tool suitable for an operation performed by the robot system 3 can be adopted. For example, an operation tool that performs welding can be adopted as an end effector.

The robot 1 of the present embodiment is an articulated robot including a plurality of joints 18. The robot 1 includes an upper arm 11 and a lower arm 12. The lower arm 12 is supported by a swivel base 13. The swivel base 13 is supported by a base 14. The robot 1 includes a wrist 15 connected to an end portion of the upper arm 11. The wrist 15 includes a flange 16 for fixing the hand 5. The components of the robot 1 are formed so as to rotate about a predetermined drive axis. The robot 1 is not limited to this form and any robot capable of moving an operation tool can be adopted.

The robot 1 of the present embodiment includes a robot drive device 21 having drive motors for driving components such as the upper arm 11. The hand 5 includes a hand drive device 22 that drives the hand 5. The hand drive device 22 of the present embodiment drives the hand 5 by air pressure. The hand drive device 22 includes an air pump and a solenoid valve for supplying compressed air to a cylinder.

The controller 2 includes a controller body 40 and a teach pendant 26 through which an operator operates the controller body 40. The controller body 40 includes an arithmetic processing device (a computer) that includes a central processing unit (CPU) as a processor. The arithmetic processing device includes a random access memory (RAM), a read only memory (ROM), and the like which are connected to the CPU via a bus. The robot 1 is driven based on operation commands from the controller 2. The robot 1 automatically transports the workpiece 38 based on an operation program 61. The robot drive device 21 and the hand drive device 22 are controlled by the controller 2.

The controller body 40 includes a storage part 42 that stores any information regarding the robot system 3. The storage part 42 can be formed of a non-temporary storage medium capable of storing information. For example, the storage part 42 can be formed of a storage medium such as a volatile memory, a nonvolatile memory, a magnetic storage medium, or an optical storage medium.

The operation program 61 prepared in advance in order to operate the robot 1 is input to the controller 2. Alternatively, the operator can set a teaching point of the robot 1 by operating the teach pendant 26 and driving the robot 1. The controller 2 can generate the operation program 61 based on the teaching point.

The operation program 61 is stored in the storage part 42. The operation control unit 43 sends an operation command for driving the robot 1 to the robot drive part 44 based on the operation program 61. The robot drive part 44 includes an electric circuit that drives a drive motor and supplies electricity to the robot drive device 21 based on the operation command. The operation control unit 43 sends an operation command for driving the hand drive device 22 to the hand drive part 45. The hand drive part 45 includes an electric circuit for driving an air pump or the like and supplies electricity to the air pump or the like based on the operation command.

The operation control unit 43 corresponds to a processor that is driven according to the operation program 61. The processor is formed so as to be able to read information stored in the storage part 42. The processor functions as the operation control unit 43 by reading the operation program 61 and performing control defined in the operation program 61.

The robot 1 includes a state detector for detecting the position and orientation of the robot 1. The state detector according to the present embodiment includes a position detector 23 attached to the drive motor of each drive axis of the robot drive device 21. The position detector 23 can be formed of, for example, an encoder that detects the rotational position of the output shaft of the drive motor. The position and orientation of the robot 1 are detected from the output of the position detector 23.

A reference coordinate system 71 that does not move when the position and orientation of the robot 1 change is set for the robot system 3. In the example illustrated in FIG. 1, the origin of the reference coordinate system 71 is placed on the base 14 of the robot 1. The reference coordinate system 71 is also called a world coordinate system. In the reference coordinate system 71, the position of the origin is fixed and the directions of the coordinate axes are also fixed. The reference coordinate system 71 has, as coordinate axes, an X axis, a Y axis, and a Z axis that are orthogonal to each other. Also, a W axis is set as a coordinate axis around the X axis. A P axis is set as a coordinate axis around the Y axis. An R axis is set as a coordinate axis around the Z axis.

The teach pendant 26 is connected to the controller body 40 via a communication device. The teach pendant 26 includes an input part 27 for inputting information regarding the robot 1 and the hand 5. The input part 27 is formed of input members such as a keyboard and dials. The teach pendant 26 includes a display part 28 that displays information regarding the robot 1 and the hand 5. The display part 28 can be formed of any display panel such as a liquid crystal display panel or an organic electro luminescence (EL) display panel. When the teach pendant includes a display panel of touch panel type, the display panel functions as an input part and a display part.

A tool coordinate system having an origin set at any position on the operation tool is set for the robot system 3. The tool coordinate system changes in position and orientation together with the operation tool. In the present embodiment, the origin of the tool coordinate system is set at a tool center point of a tool of the hand 5. The position of the robot 1 corresponds to the position of the tool center point of the tool (the position of the origin of the tool coordinate system). Also, the orientation of the robot 1 corresponds to the orientation of the tool coordinate system with respect to the reference coordinate system 71.

The robot system 3 according to the present embodiment includes an imaging device that detects the position of the workpiece 38. The imaging device detects the position of the workpiece 38 on the pedestal 95 before the hand 5 grips the workpiece 38. The imaging device includes a camera 6 serving as a vision sensor that captures an image of the workpiece 38. The camera 6 of the present embodiment is a two-dimensional camera that captures a two-dimensional image. The camera 6 is supported by the robot 1. The camera 6 is fixed to the hand 5 via a support member.

The camera 6 can capture an image in a field of view 6a. The camera 6 has a focus adjustment mechanism 24 for adjusting the focus. The focus adjustment mechanism 24 of the present embodiment has an automatically focusing function. In other words, the camera 6 has an autofocus function. The camera 6 is formed so as to automatically focus on the workpiece 38 and image the workpiece 38 when the robot 1 changes in position and orientation. A mechanism for focusing by arbitrary control such as a contrast detection method or a phase difference method can be adopted as a focus control mechanism.

Alternatively, a camera with a liquid lens can be adopted as a vision sensor. In this case, a mechanism for changing the shape of the liquid lens can be adopted as the focus adjustment mechanism. For example, a mechanism for changing a voltage applied to the liquid lens or a mechanism for moving a holding member of the liquid lens for changing a water pressure applied to the liquid lens can be adopted.

In the robot system 3, a camera coordinate system 72 is set for the camera 6 as a sensor coordinate system. The camera coordinate system 72 changes in position and orientation together with the camera 6. The origin of the camera coordinate system 72 is set at a predetermined position on or in the camera 6 such as the lens center or optical center of the camera 6. The camera coordinate system 72 has an X axis, a Y axis, and a Z axis that are orthogonal to each other. The camera coordinate system 72 of the present embodiment is set such that the Z axis is parallel to the optical axis of the lens of the camera 6.

The imaging device of the present embodiment includes a movement device that moves one of the workpiece 38 serving as a target object and the camera 6, and changes the position of one relative to the other. In the first robot system 3, the robot 1 functions as a movement device. When the position and orientation of the robot 1 change, the position and orientation of the camera 6 also change.

The imaging device includes an image processing device that processes an image captured by the vision sensor. In the robot system 3 of the present embodiment, the controller body 40 functions as an image processing device. The controller body 40 includes an image processing unit 51 that processes an image captured by the camera 6. The image processing unit 51 includes an imaging control unit 58 that sends a command for capturing an image to the camera 6.

The image processing unit 51 includes a focus position detecting unit 52 that detects a focus position where the camera 6 is focused. The image processing unit 51 includes a parameter setting unit 53 that sets parameters for calculating a three-dimensional position corresponding to a specific position in the image captured by the camera 6. The image processing unit 51 includes a feature detecting unit 54 that detects a predetermined feature portion in the image of the workpiece 38. The image processing unit 51 includes a feature position calculating unit 55 that calculates a three-dimensional position of the feature portion using the parameters set by the parameter setting unit 53. The image processing unit 51 includes a distance calculating unit 56 that calculates the distance from the camera 6 to the workpiece 38. The image processing unit 51 includes an operation command generating unit 59 that generates operation commands for the robot 1 and the hand 5 based on the result of image processing.

The image processing unit 51 corresponds to a processor that is driven according to the operation program 61. In particular, each of the focus position detecting unit 52, the parameter setting unit 53, the feature detecting unit 54, the feature position calculating unit 55, the distance calculating unit 56, the imaging control unit 58, and the operation command generating unit 59 corresponds to a processor that is driven according to the operation program 61. The processor functions as each of the units by reading the operation program 61 and performing control defined in the operation program 61.

Referring to FIG. 1, the first robot system 3 of the present embodiment places the workpiece 38 on the surface of the pedestal 95 by using a predetermined method. For example, the operator or another robot system places the workpiece 38 on the surface of the pedestal 95. Then, the robot 1 changes in position and orientation and grips, with the hand 5, the workpiece 38 placed on the top surface of the pedestal 95. The robot system 3 transports the workpiece 38 to a predetermined position by changing the position and orientation of the robot 1.

When the workpiece 38 is placed on the surface of the pedestal 95, the position of the workpiece 38 on the pedestal 95 may be displaced. A position P38a determined in a teaching task for teaching the position and orientation of the robot 1 is illustrated in the example illustrated in FIG. 1. The position P38a is a position where it is desirable to place the workpiece 38 and is a reference position for placing the workpiece 38.

However, when a workpiece 38 is actually placed on the top surface of the pedestal 95, the workpiece 38 may be placed at a position P38b displaced from the reference position P38a. Alternatively, the workpiece 38 may have dimensional errors. In the robot system 3, the camera 6 captures an image of the workpiece 38. The image processing unit 51 then calculates a three-dimensional position of the workpiece 38 based on the image of the workpiece 38. For example, the image processing unit 51 detects the three-dimensional position of the feature portion of the workpiece 38. Then, the image processing unit 51 calculates the position of the workpiece 38 based on the three-dimensional position of the feature portion of the workpiece 38. Such a position of the workpiece 38 can be calculated in the reference coordinate system 71. The image processing unit 51 controls the position and orientation of the robot 1 so as to correspond to the position of the workpiece 38. Then, the workpiece 38 is gripped with the hand 5 and transported to a desired predetermined position.

Figure 3:
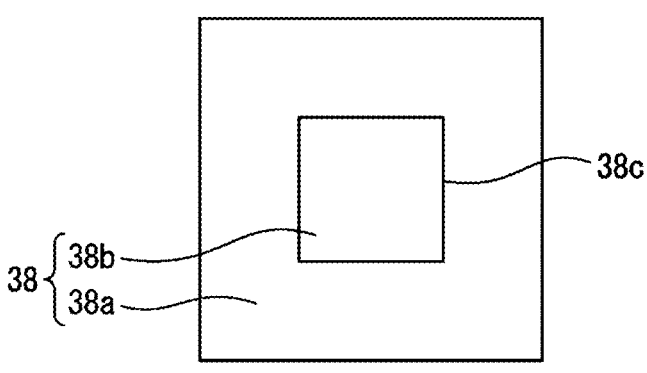
FIG. 3 is a plan view of a workpiece according to the embodiment.

FIG. 3 illustrates a plan view of the workpiece 38 according to the present embodiment. Referring to FIG. 1 and FIG. 3, the workpiece 38 includes a plate-like portion 38a and a plate-like portion 38b formed on the plate-like portion 38a. The plate-like portions 38a and 38b each have a rectangular parallelepiped shape. The plate-like portion 38b has an edge portion 38c on the outer periphery of a top surface thereof. The edge portion 38c is a portion corresponding to a corner formed in the plate-like portion 38b. In the present embodiment, the edge portion 38c having a quadrangular shape in plan view is a feature portion of the workpiece 38.

Referring to FIG. 1, the camera 6 is disposed vertically above the workpiece 38 in the present embodiment. At this time, the distance from the surface of the workpiece 38 on which the feature portion is formed to the camera 6 is predetermined. In this example, the position and orientation of the robot 1 are controlled such that the position of the top surface of the plate-like portion 38b has a predetermined value of Z axis in the camera coordinate system 72. Also, the orientation of the camera 6 is adjusted such that the optical axis of the camera 6 is substantially perpendicular to the surface of the plate-like portion 38b having the feature portion of the workpiece 38.

The camera 6 performs focusing and captures an image of the workpiece 38. The feature detecting unit 54 of the image processing unit 51 detects the edge portion 38c as a feature portion of the workpiece 38 by performing pattern matching. A reference image for detecting the position of the edge portion 38c is created in advance and stored in the storage part 42. The feature detecting unit 54 detects the edge portion 38c serving as the feature portion in the image captured by the camera 6 by using the reference image.

The feature position calculating unit 55 calculates the position of the workpiece in the three-dimensional space based on the position of the feature portion in the image captured by the camera. The position of any set point that is set for the workpiece can be calculated as the position of the workpiece. The position of the workpiece 38 can be acquired in the reference coordinate system 71.

The operation command generating unit 59 calculates the position and orientation of the robot 1 based on the position of the workpiece 38 calculated by the feature position calculating unit 55. Then, the position and orientation of the robot 1 for gripping the workpiece 38 are sent to the operation control unit 43. The operation control unit 43 drives the robot 1 and the hand 5 so as to grip the workpiece 38 based on an operation command received from the operation command generating unit 59.

In the control for gripping a workpiece according to the present embodiment, the feature detecting unit 54 detects a feature portion and the feature position calculating unit 55 accurately calculates a three-dimensional position of the workpiece based on the position of the feature portion. Thus, the robot system 3 can more reliably grip the workpiece 38. The robot system 3 can reliably grip the workpiece 38 even if the position of the workpiece 38 on the pedestal 95 (the position of the workpiece 38 in the reference coordinate system 71) differs from the reference position or the workpiece has dimensional errors.

Referring to FIG. 1, the focus position where the camera is focused may be displaced when the position of the workpiece 38 is displaced or due to individual differences of the workpiece or the like. In this regard, any variable corresponding to the position of the lens driven by the focus adjustment mechanism 24 can be adopted as the focus position. For example, the focus adjustment mechanism 24 may include a drive motor for driving the position of the lens for focusing. In this case, a rotational position of the output shaft of the drive motor at which focus is achieved can be adopted as the focus position. Alternatively, a focus ring for focusing may be arranged at the lens. The position of the focus ring can be set as the focus position. Alternatively, when the camera includes a plurality of lenses, the position of a predetermined lens can be set as the focus position. Also, in the case of a camera including a liquid lens, the magnitude of a voltage applied to the liquid lens can be adopted as the focus position. Alternatively, the rotational position of the output shaft of the motor included in the drive mechanism for the holding member that changes the pressure applied to the liquid lens can be adopted as the focus position.

Figure 4:
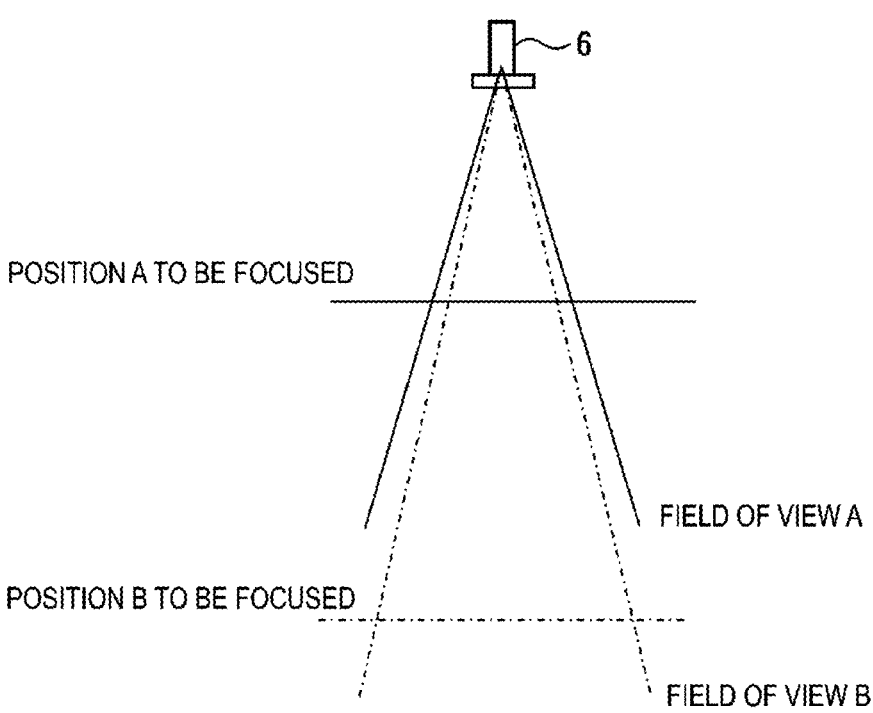
FIG. 4 is a schematic diagram for explaining a position on which a camera is focused and a field of view of the camera.

FIG. 4 illustrates a schematic diagram for explaining the field of view when the position to be focused changes. The field of view of the camera 6 corresponds to the angle of view or imaging range. Positions A and B to be focused are illustrated in FIG. 4. The imaging range of the camera 6 is a field of view A when it is focused on the position A. The imaging range of the camera 6 is a field of view B when it is focused on the position B. Thus, when the position to be focused changes, the size of the field of view changes. When the position to be focused changes with the position of the feature portion of the workpiece remaining the same, the position of the feature portion in the image changes.

Figure 5:
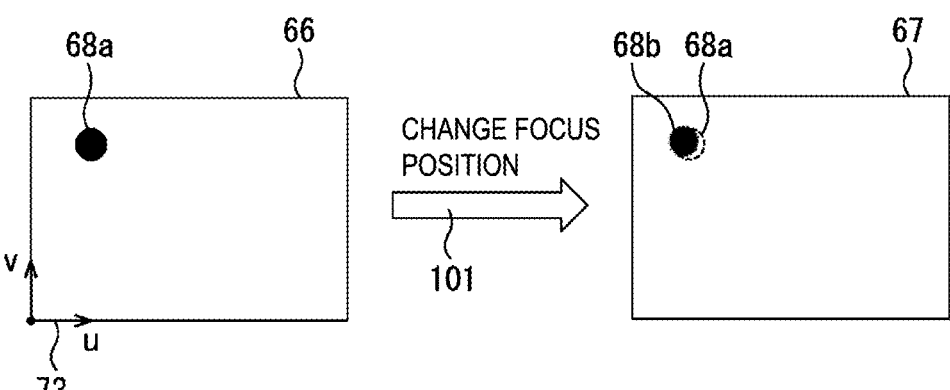
FIG. 5 is an example of an image when the position to be focused changes.

FIG. 5 illustrates an example of an image captured by the camera when the position to be focused changes. An image 66 is an image when one position is focused, which corresponds to, for example, the position A in FIG. 4. An image 67 is an image when another position is focused, which is, for example, an image corresponding to the position B in FIG. 4. An image coordinate system 73 is set for the images 66 and 67.

The images 66 and 67 respectively include hole images 68a and 68b as feature portions. By changing the position to be focused, the position of the hole image 68a in the image 66 becomes the position of the hole image 68b in the image 67 as indicated by an arrow 101. When the focus position changes, the position of feature point in the image changes. In a mathematical model, changing the position to be focused is synonymous with changing the focal length.

Figure 6:
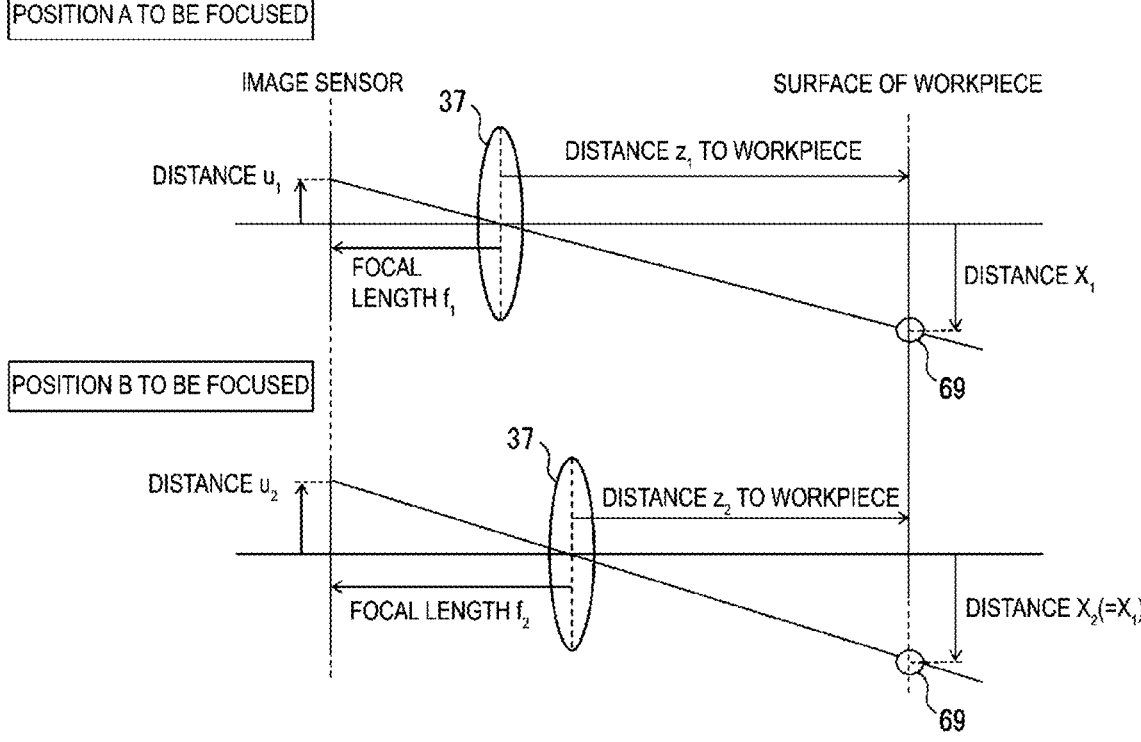
FIG. 6 is a schematic diagram of an image sensor, a lens, and a feature portion of a workpiece when the position of the lens is moved for focusing.

FIG. 6 illustrates a schematic diagram for explaining a position in a pixel sensor at which a feature point of a target object is imaged. A lens 37 is arranged between the surface of a workpiece and the image sensor that produces an image in the camera. Focal lengths $f_1$ and $f_2$ correspond to distances from the image sensor to the lens center of the lens 37. FIG. 6 illustrates a position A to be focused and a position B to be focused. The position A corresponds to the lens 37 being placed at the focal length $f_1$. The position B corresponds to the lens 37 being placed at the focal length $f_2$. The distance $z_1$ and $z_2$ from the lens 37 to the workpiece changes in response to the focal length $f_1$ and $f_2$.

At the position A, a feature portion 69 placed at a distance $X_1$ from the optical axis on the surface of the workpiece is detected at a position in the image sensor at a distance $u_1$ from the optical axis. At the position B, the feature portion 69 placed at a position at a distance $X_2$ which is the same as the distance $X_1$ is detected at a position in the image sensor at a distance $u_2$. For example, a relationship $X_2/z_2 = u_2/f_2$ holds for the position B. Because the focal length $f_2$ is greater than the focal length $f_1$, the distance $u_2$ in the image sensor is greater than the distance $u_1$. Thus, the position of the feature portion in the image of the camera changes in response to the focus position even if the position on the surface of the workpiece remains the same.

The parameter setting unit 53 calculates, based on the focus position, parameters of a calculation model for calculating the position of the feature portion of the workpiece from the image captured by the camera. The feature position calculating unit 55 calculates a three-dimensional position from a specific position in the image by using the calculation model. The three-dimensional position of the feature portion on the surface of the workpiece is calculated using the parameters set corresponding to the focus position.

Subsequently, a calculation model for calculating a three-dimensional position in space from an image captured by a camera will be described. A position in the image of the camera corresponding to any position in space is usually represented by the following equation (1) by using the pinhole camera model.

[Math. 1]

$$\underset{\substack{\text{Position} \\ \text{on image}}}{\begin{bmatrix} u \\ v \\ 1 \end{bmatrix}} = \underset{\substack{\text{Intrinsic} \\ \text{parameter matrix}}}{\begin{bmatrix} f_x & 0 & c_x \\ 0 & f_y & c_y \\ 0 & 0 & 1 \end{bmatrix}} \underset{\substack{\text{Extrinsic} \\ \text{parameter matrix}}}{\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}} \underset{\substack{\text{Three-dimensional} \\ \text{position}}}{\begin{bmatrix} X \\ Y \\ Z \\ 1 \end{bmatrix}} \quad (1)$$

$[u, v]$: Coordinate values of camera coordinate system $f_x, f_y$: Product of focal length and effective pixel size $C_x, C_y$: Image center $[Y, Y, Z]$: Coordinate values of reference coordinate system The coordinate values (X, Y, Z) of the three-dimensional position are expressed, for example, in the reference coordinate system 71. The coordinate values (u, v) of the position in the image are expressed, for example, in the image coordinate system 73. The extrinsic parameter matrix is a transformation matrix for transforming a three-dimensional position in space into coordinate values in the camera coordinate system 72. The intrinsic parameter matrix is a matrix for transforming coordinate values in the camera coordinate system 72 into coordinate values in the image coordinate system 73 in the image. In this case, the Z axis value of the three-dimensional position or the z axis coordinate value in the camera coordinate system 72 is predetermined, corresponding to the distance from the camera to the workpiece.

The above equation (1) is an ideal example in which there is no lens distortion or the like. In practice, parameter changes or the like due to lens distortion or the like are taken into account. First, the computation of a part of equation (1) corresponding to the three-dimensional position in space and the extrinsic parameter matrix can be expressed by the following equation (2).

[Math. 2]

$$\begin{bmatrix} x \\ y \\ z \end{bmatrix} = R \begin{bmatrix} X \\ Y \\ Z \end{bmatrix} + t \quad (2)$$

$t$: $[t_1, t_2, t_3]$ $R$: $3 \times 3$ rotation matrix

The coordinate values (X, Y, Z) expressed in the reference coordinate system 71 can be transformed into the coordinate values (x, y, z) expressed in the camera coordinate system 72 by using equation (2). Next, a variable x' and a variable y' are defined as shown in the following equation (3) and equation (4) in order to take into account lens distortion of the camera. Further, a variable x" and a variable y" that take distortion into account are calculated as shown in equation (5) and equation (6). In this regard, the relationship between the variable x', the variable y', and a variable r is as shown in equation (7).

[Math. 3]

$$x' = x/z \quad (3)$$

$$y' = y/z \quad (4)$$

$$x'' = x' \frac{1 + k_1 r^2 + k_2 r^4 + k_3 r^6}{1 + k_4 r^2 + k_5 r^4 + k_6 r^6} + 2p_1 x' y' + p_2 \left(r^2 + 2x'^2\right) \quad (5)$$

$$y'' = y' \frac{1 + k_1 r^2 + k_2 r^4 + k_3 r^6}{1 + k_4 r^2 + k_5 r^4 + k_6 r^6} + p_1 \left(r^2 + 2y'^2\right) + 2p_2 x' y' \quad (6)$$

where $$r^2 = x'^2 + y'^2 \quad (7)$$

In equation (5) and equation (6), coefficients $k_1$ to $k_6$ are coefficients relating to lens distortion in the radial direction and coefficients $p_1$ and $p_2$ are coefficients relating to lens distortion in the circumferential direction. The variables x" and y" that take lens distortion into account are used, whereby the coordinate values (u, v) of the image coordinate system 73 in the image can be calculated as shown in the following equation (8) and equation (9). Equation (8) and equation (9) are a part corresponding to a computation using the intrinsic parameter matrix in the above equation (1).

[Math. 4]

$$u = f_x * x'' + c_x \quad (8)$$

$$v = f_y * y'' + c_y \quad (9)$$

While the above description describes a method of calculating a position in an image from a three-dimensional position in space, a three-dimensional position (X, Y, Z) in space is calculated in the present embodiment based on the coordinate values (u, v) of the position in the image and the distance z from the camera 6 to the workpiece 38 in the camera coordinate system 72, based on the above relationship. The distance z from the camera 6 to the workpiece 38 can be predetermined and stored in the storage part 42. The feature position calculating unit 55 calculates a three-dimensional position (X, Y, Z) in space from the coordinate values (u, v) of a specific position in the image based on the calculation model.

In this regard, with reference to equation (2) to equation (9), the calculation model for calculating a three-dimensional position from a position in the image requires the product $f_x$, $f_y$ of the focal length and the effective image size, the image center $c_x$, $c_y$, and distortion coefficients $k_1$ to $k_6$ and $p_1$ and $p_2$. These parameters change according to the focus position where the camera is focused.

In the present embodiment, setting information 63 for setting parameters corresponding to focus positions is predetermined. The setting information 63 is stored in the storage part 42. The parameter setting unit 53 sets these parameters by using the focus position and the setting information 63. Table 1 shows a table of values of a parameter corresponding to focus positions pp as the setting information 63.

TABLE 1

| pp | fx |
|---|---|
| 1 | 2 |
| 2 | 4 |
| 3 | 6 |
| 4 | 8 |

In this example, values of the product $f_x$ of the focal length and the effective pixel size as an example of a parameter are shown. In the setting information 63 of the present case, values of a parameter are predetermined for a plurality of discrete focus positions pp. The parameter setting unit 53 sets the parameter of the calculation model based on the value of parameter determined for each focus position. For example, in a case in which the focus position pp is 1.4 when the image is captured by the camera 6, the parameter setting unit 53 can set the value of the product $f_x$ serving as a parameter to 2.8 through interpolation. In the parameter setting, parameters can be set through any method by using a table containing discrete parameter values. For example, a median value of the two parameter values corresponding to the two focus positions pp may be used or a parameter value corresponding to the closer focus positions pp may be used.

By using setting information including parameter values for discrete focus positions, the parameter setting unit can set the parameter in response to any focus position. The parameter setting unit can set the parameter through simple calculation. Alternatively, even when it is difficult to set a function described below, the parameter can be set in response to the focus position.

The function for calculating parameter in response to the focus position pp can be defined as setting information. The parameter can be calculated by a mathematical expression including the focus position pp. For example, a function f(pp) for calculating the product f of the focal length and the effective pixel size with respect to the focus position pp can be predetermined as shown in equation (10). Alternatively, a function k(pp) for calculating the distortion coefficients k with respect to the focus position pp can be predetermined as shown in equation (11).

[Math. 5]

$$f = f(pp) \tag{10}$$

$$k = k(pp) \tag{11}$$

For example, equations of higher degree of the focus position pp serving as a variable can be adopted as such functions. The parameter setting unit 53 can set each of the parameters relating to distortion using a function. The feature position calculating unit 55 can calculate the three-dimensional position of the feature portion based on the parameters set by the parameter setting unit 53.

Figure 7:
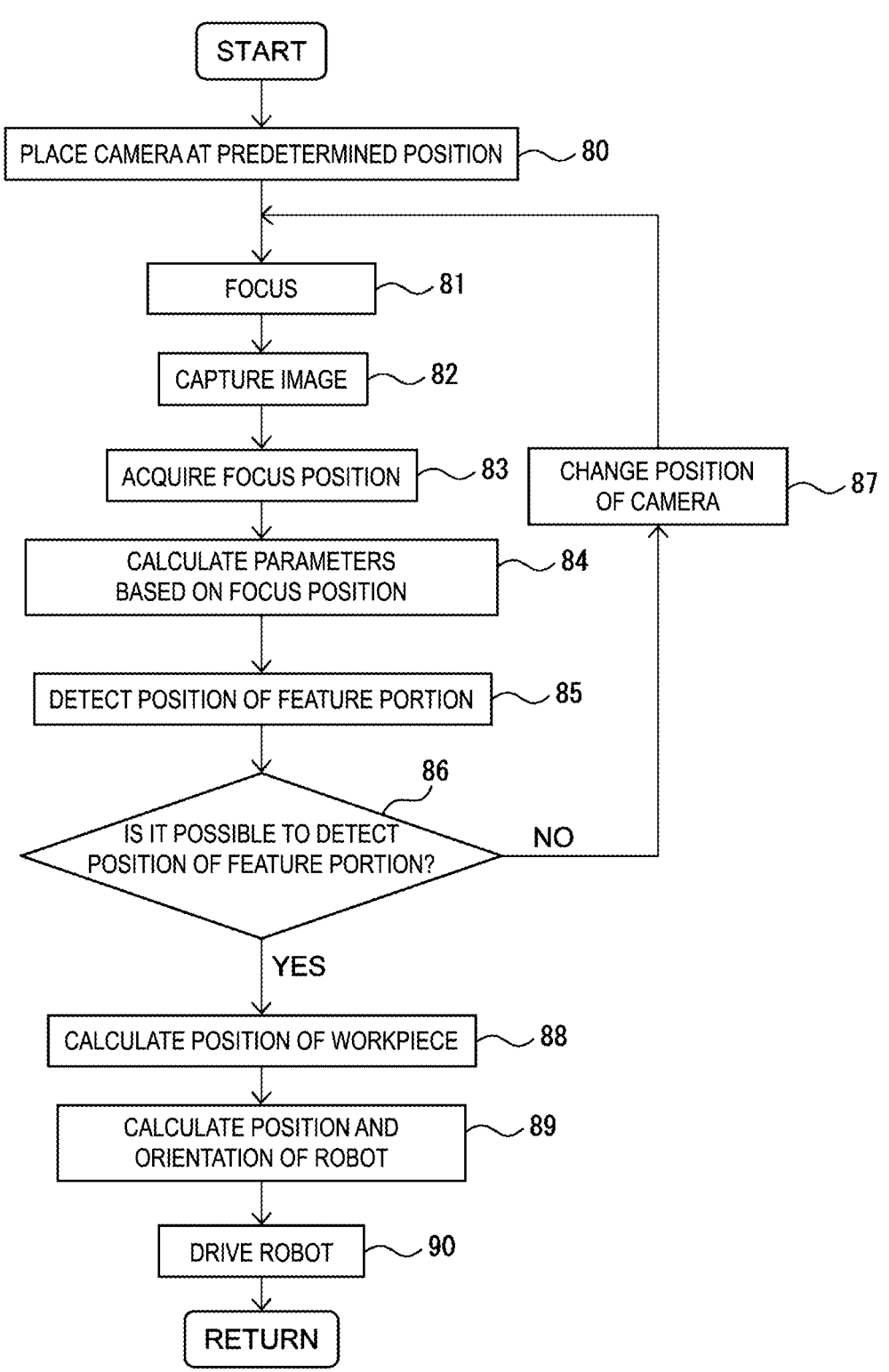
FIG. 7 is a flowchart for explaining control of the first robot system.

FIG. 7 illustrates a flowchart of control according to the present embodiment. With reference to FIG. 1, FIG. 2, and FIG. 7, the operator predetermines setting information for calculating the parameters of the calculation model. Then, the operator causes the storage part 42 to store the setting information 63.

In step 80, the operation control unit 43 moves the camera 6 to an imaging position for imaging the workpiece 38. In the present embodiment, the camera 6 is placed directly above the reference position P38a of the workpiece 38. Also, the orientation of the camera 6 is adjusted such that the direction of the Z axis of the camera coordinate system 72 is parallel to the vertical direction. In this regard, the distance from the surface of the plate-like portion 38b of the workpiece 38 on which the feature portion is formed to the camera 6 is predetermined.

Next, in step 81, the focus adjustment mechanism 24 of the camera 6 focuses the camera 6. The focus adjustment mechanism 24 of the present embodiment has an autofocus function and thus performs autofocusing. In step 82, the imaging control unit 58 captures an image with the camera 6. The image is captured in focus.

In step 83, the focus position detecting unit 52 detects the focus position when the image is captured. The focus position detecting unit 52 detects, for example, a predetermined variable corresponding to the position of the lens. In step 84, the parameter setting unit 53 sets parameters of a calculation model for calculating the three-dimensional position of the feature portion based on the focus position and the setting information.

Next, in step 85, the feature detecting unit 54 detects a feature portion in the image by performing pattern matching. In the present embodiment, an edge portion 38c in the image is detected by performing pattern matching by using a reference image of the edge portion 38c of the plate-like portion 38b. The feature position calculating unit 55 detects the position of the feature portion in the image.

Next, in the present embodiment, control for changing the position of the camera 6 with respect to the workpiece 38 and capturing an image is performed when the position of the feature portion of the workpiece cannot be detected. For example, the feature portion may appear white due to reflection of light from illumination, thereby making the feature portion unclear. In such a case, it may be possible to clearly image the feature portion by moving the position of the camera.

In step 86, the image processing unit 51 determines whether or not the position of the feature portion is detected. When the feature position calculating unit 55 cannot detect the position of the feature portion, control proceeds to step 87.

In step 87, the operation command generating unit 59 generates a command for changing the position of the camera 6. For example, the operation command generating unit 59 generates a command for translating the camera 6 in a predetermined direction by a predetermined movement amount. Referring to FIG. 1, for example, the operation command generating unit 59 generates a command for moving the camera 6 in the X axis direction of the camera coordinate system 72. The operation command generating unit 59 sends the operation command for the robot 1 to the operation control unit 43. The operation control unit 43 changes the position and orientation of the robot 1. Then, the control returns to step 81. The image processing unit 51 repeats the control from step 81 to step 86.

In step 86, when the feature position calculating unit 55 has calculated the position of the feature portion, the control proceeds to step 88. The control may be stopped when the feature portion cannot be detected even after changing the position and orientation of the robot a plurality of times.

In step 88, the feature position calculating unit 55 calculates the three-dimensional position of the feature portion based on the position of the feature portion in the image. The coordinate values of the reference coordinate system 71 are calculated based on the coordinate values of the image coordinate system 73 in the image. The feature position calculating unit 55 calculates the position of the workpiece based on the three-dimensional position of the feature portion. The position of the workpiece can be calculated, for example, in the reference coordinate system 71.

In step 89, the operation command generating unit 59 calculates the position and orientation of the robot 1 based on the position of the workpiece. Then, in step 90, the operation command generating unit 59 sends operation commands for driving the robot 1 to the operation control unit 43. The operation control unit 43 drives the robot 1 and the hand 5 based on the operation commands.

As described above, the imaging device according to the present embodiment sets, in response to the focus position, parameters of a calculation model for calculating a three-dimensional position corresponding to a specific position in an image captured by the vision sensor. Then, the three-dimensional position of the specific position is calculated based on parameters corresponding to the focus position.

By performing this control, it is possible to accurately detect the three-dimensional position of the feature portion when the focus position changes. In particular, there is no need to fix the focus position in advance and an image can be captured at any focus position and a three-dimensional position with a small error can be calculated. In other words, there is no need to predetermine the relative position of the camera with respect to the workpiece for performing focusing, and the camera can be placed at any position and focused for performing imaging. In the present embodiment, there is no need to newly add parameters of the calculation model even when the number of positions to be focused (relative positions of the camera with respect to the workpiece) increases. The imaging device of the present embodiment expands the range in which the robot can be driven and increases the number of patterns for driving the robot, compared to the technologies of the conventional art.

In particular, when the focus adjustment mechanism of the vision sensor has an automatically focusing function, the focus position is set to any position within a predetermined range. In this case, the imaging device can set parameters corresponding to the focus position and detect an accurate position of the workpiece. It should be noted that the vision sensor may not have the automatically focusing function. In this case, the operator can manually focus. For example, the operator may focus by operating the input part 27 while viewing an image displayed on the display part 28 of the teach pendant 26.

The robot system according to the present embodiment includes a robot as a movement device that moves at least one selected from among the workpiece and the vision sensor. Thus, when the robot changes the relative position of the camera with respect to the workpiece, the focus position where the camera is focused changes. Also in this case, the imaging device can set parameters corresponding to the focus position and detect an accurate position of the workpiece.

Referring to FIG. 2, the display part 28 of the teach pendant 26 of the present embodiment displays the values of parameters set by the parameter setting unit 53. The operator can view the parameters displayed on the display part 28 of the teach pendant 26 and check the values of the parameters. In particular, when the three-dimensional position calculated by the feature position calculating unit 55 is incorrect, the operator can check the values of parameters set in response to each focus position.

Incidentally, the distance calculating unit 56 of the image processing unit 51 according to the present embodiment can calculate the distance from the camera 6 to the workpiece 38 based on the focus position detected by the focus position detecting unit 52. The focus position depends on the distance between the camera 6 and the workpiece 38. Therefore, once a focus position is determined, the distance between the camera 6 and the workpiece 38 can be estimated.

The distance calculating unit 56 estimates the distance from the origin of the camera coordinate system 72 to the surface of the plate-like portion 38b of the workpiece 38 when the surface of the plate-like portion 38b is focused. For example, the operator can create in advance a function for calculating the z axis coordinate value of the camera coordinate system 72 with the focus position pp as a variable. The z axis coordinate value of the camera coordinate system 72 corresponds to the distance from the camera 6 to the workpiece 38. The distance calculating unit 56 can calculate the z axis coordinate value of the camera coordinate system 72 by using the focus position pp and the function. Alternatively, the operator can determine the distance from the camera 6 to the workpiece 38 for each of a plurality of discrete focus positions. The distance calculating unit 56 can calculate the distance from the camera 6 to the workpiece 38 by calculation such as interpolation based on an actually detected focus position pp.

Thus, the distance calculating unit 56 of the present embodiment can calculate the distance from the camera 6 to the target object. In general, the distance from the camera to the target object needs to be predetermined. However, the image processing unit 51 includes the distance calculating unit 56 and thus can calculate the distance from the camera 6 to the workpiece 38. The distance from the camera to the workpiece can be calculated, for example, when it is manually focused while viewing an image. Accordingly, the image processing unit 51 can calculate the three-dimensional position of the feature portion of the workpiece without setting the distance from the camera to the target object.

Figure 8:
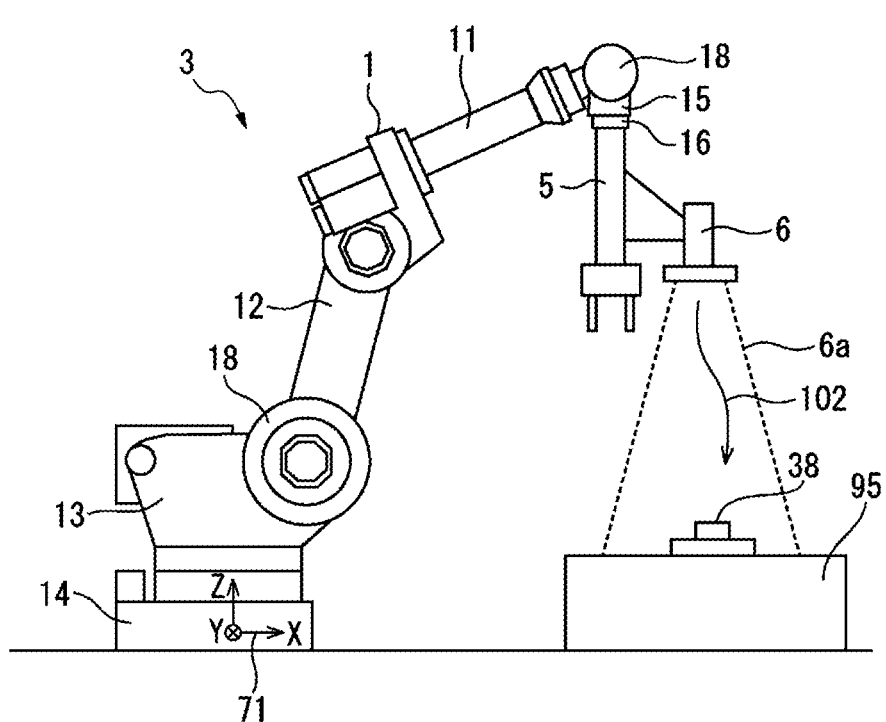
FIG. 8 is a first schematic diagram for explaining another control of the first robot system.

FIG. 8 illustrates a schematic diagram for explaining a first step of another control of the first robot system according to the present embodiment. In the other control, the image processing unit 51 detects the three-dimensional position of the workpiece 38 based on an image captured by the camera 6 placed at a first imaging position. Based on the position of the workpiece 38, the image processing unit 51 calculates a second imaging position closer to the workpiece 38 than that of the first imaging position. The image processing unit 51 moves the position and orientation of the robot 1 to the second imaging position as indicated by an arrow 102. The second imaging position is a position where the distance from the target object to the vision sensor is smaller than that of the first imaging position. Also, the second imaging position is a position where the workpiece 38 is placed substantially in the center of the image.

Next, the image processing unit 51 calculates the three-dimensional position of the workpiece 38 based on an image captured at the second imaging position. Then, control for driving the robot 1 and gripping the workpiece 38 is performed based on the position of the workpiece 38.

When the workpiece 38 is placed on the pedestal 95, the position of the workpiece 38 may be significantly displaced. Thus, the position and orientation of the robot 1 can be predetermined such that the camera 6 is placed at the first imaging position away from the workpiece 38. Control for automatically focusing by the autofocus function is performed at the first imaging position. In the image captured by the camera 6 at the first imaging position, the workpiece 38 is imaged in a small size. However, the position of the workpiece 38 can be detected by the feature detecting unit 54 and the feature position calculating unit 55.

Next, the operation command generating unit 59 calculates a second imaging position of the camera 6 in order to image the workpiece 38 at a closer position than the first imaging position. The second imaging position is determined such that the workpiece is placed substantially at the center of the image. Also, the second imaging position is set at a position where the camera 6 is closer to the workpiece 38 directly above the workpiece 38.

The relationship between the current position of the workpiece 38, the movement amount of the camera 6, and the position of the workpiece 38 in the camera coordinate system 72 is expressed, for example, as the relationship of equation (12) below.

[Math. 6]

$$\begin{bmatrix} x \\ y \\ z \end{bmatrix} = R \begin{bmatrix} X \\ Y \\ Z \end{bmatrix} + \begin{bmatrix} t_x \\ t_y \\ t_z \end{bmatrix} \tag{12}$$

$[t_x, t_y, t_z]$: Amount of movement of camera $[X, Y, Z]$: Current position of workpiece $[x, y, z]$: Position of workpiece at camera coordinate system $R$: Rotation matrix In the present case, in order to place the workpiece 38 substantially at the center of the image, it suffices to place the workpiece on the optical axis of the camera. In other words, it is sufficient if x=y=0 in the camera coordinate system 72. By substituting x=y=0 into equation (12) and thus modifying the equation, the following equation (13) can be obtained. Then, the movement amount ($t_x$, $t_y$, $t_z$) of the camera in the reference coordinate system 71 can be calculated from equation (13).

[Math. 7]

$$\begin{bmatrix} t_x \\ t_y \\ t_z - z \end{bmatrix} = -R \begin{bmatrix} X \\ Y \\ Z \end{bmatrix} \tag{13}$$

Next, regarding the distance from the workpiece 38 to the camera 6, the z axis coordinate value of the surface of the workpiece 38 in the camera coordinate system 72 at the first imaging position is expressed by z'. The ratio of the size of the workpiece to the size of the image at the first imaging position is expressed by a. For example, the ratio of the length of the workpiece to the length of the image in one direction of the image can be adopted as the ratio of the size of the workpiece to the size of the image. The ratio of the size of the workpiece to the size of the image can be detected by the feature position calculating unit 55.

Next, the z axis coordinate value of the surface of the workpiece 38 in the camera coordinate system 72 at the second imaging position is expressed by z". A desired ratio of the size of the workpiece to the size of the image is expressed by k. This ratio can be predetermined by the operator. In this regard, when the camera 6 moves from the first imaging position to the second imaging position, the focus position of the camera 6 changes. However, in the calculation of the present case, it is assumed that the focal length corresponding to the focus position remains constant even when the camera 6 moves from the first imaging position to the second imaging position. The coordinate value z" at the second imaging position can be represented as z"=(k/a)z'. The camera 6 can be brought closer to the workpiece 38 such that the distance from the camera 6 to the workpiece 38 becomes the coordinate value z".

The operation command generating unit 59 changes the position and orientation of the robot 1 such that the camera 6 is placed at the second imaging position as indicated by an arrow 102 based on the amounts of movement in the x axis direction, the y axis direction, and the z axis direction in the camera coordinate system 72.

Figure 9:
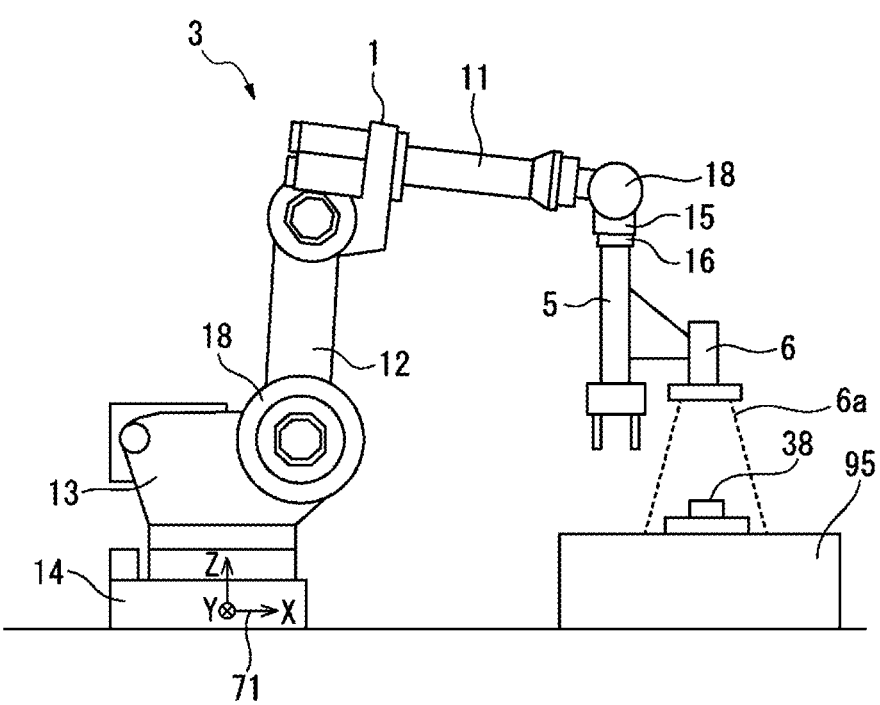
FIG. 9 is a second schematic diagram for explaining another control of the first robot system.

FIG. 9 illustrates a schematic diagram for explaining a second step of the other control of the first robot system. FIG. 9 illustrates a schematic diagram of the robot system when the camera is placed at the second imaging position. The second imaging position of the camera 6 is closer to the workpiece 38 than the first imaging position. At the second imaging position, control for automatically focusing is performed through the autofocus function of the camera 6. In the image captured at the first imaging position, the position of the workpiece 38 may not be accurately detected because the proportion of the workpiece 38 in the image is small. In the image captured at the second imaging position, the workpiece 38 occupies a larger proportion. Therefore, the position of the workpiece 38 can be accurately calculated.

Thus, the operation command generating unit 59 can calculate the second imaging position based on the three-dimensional position of the workpiece 38 in the image captured at the first imaging position. Then, the feature position calculating unit 55 calculates the three-dimensional position of the feature portion based on the image captured at the second imaging position. Even if the focus position where the cameras is focused differs at the first imaging position and the second imaging position, the three-dimensional position of the feature portion can be detected at each imaging position. In particular, the robot system performs an operation based on the image captured at the second imaging position, whereby it is possible to move the operation tool to an accurate position and perform highly accurate operation.

In the first robot system 3, the position of the workpiece 38 placed on the pedestal 95 is detected in order to grip the workpiece 38, but the embodiment is not limited to this. The image processing unit 51 can detect the workpiece 38 based on the captured image and inspect the workpiece 38. For example, the image processing unit 51 can measure the dimensions of the workpiece from the captured image. Then, the image processing unit 51 can inspect the dimensions of the workpiece based on predetermined determination values for the dimensions. In this case, only the vision sensor may be attached to the robot 1 without attaching the operation tool to the robot 1.

The inspection of the workpiece is not limited to the inspection of the dimensions of the workpiece and any inspection can be performed. For example, it is possible to inspect whether or not a predetermined component is placed on the surface of the workpiece. Alternatively, it is possible to inspect whether or not there are flaws on the surface of the workpiece. In any case, highly accurate inspection can be performed because the position of the feature portion can be accurately detected according to the focus position.

The first robot system 3 is formed such that the workpiece is stopped and the camera is moved by the movement device, but is not limited to this form. The position of the camera may be fixed and the workpiece may be moved by the movement device. Alternatively, the movement device may be formed so as to move both the camera and the workpiece.

Figure 10:
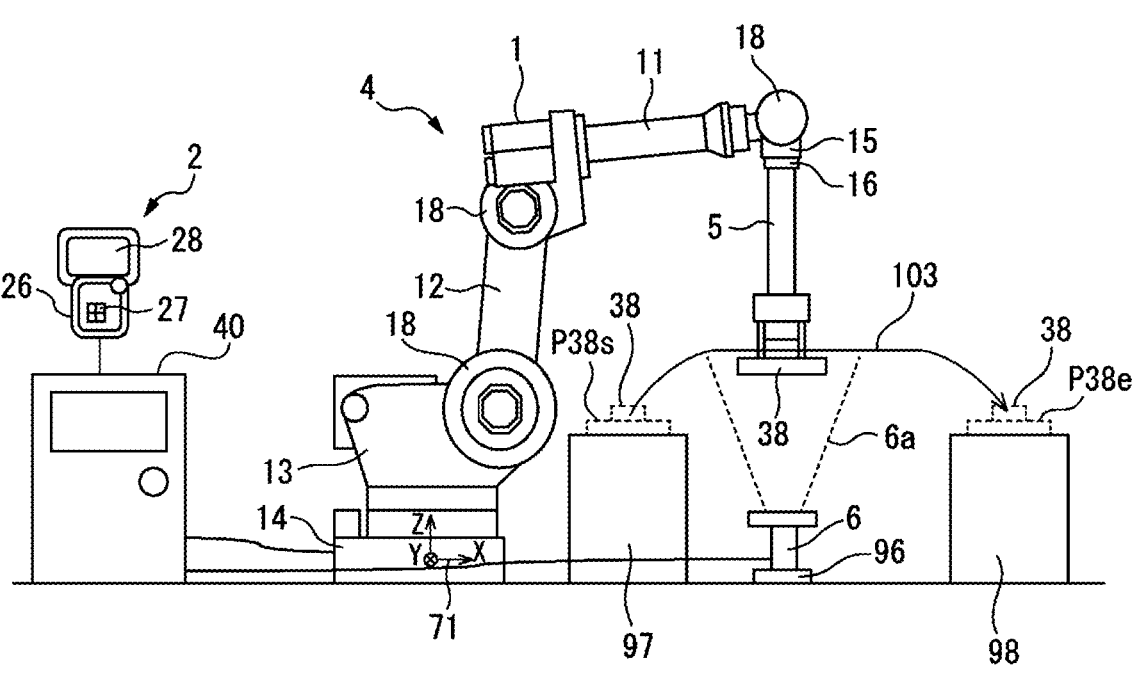
FIG. 10 is a schematic diagram of a second robot system according to the embodiment.

FIG. 10 illustrates a schematic diagram of a second robot system according to the present embodiment. In the second robot system 4, a camera 6 is fixed to a pedestal 96. A workpiece 38 is supported by a robot 1. The second robot system 4 transports the workpiece 38 placed on a pedestal 97 to a pedestal 98 as indicated by an arrow 103. The workpiece 38 is transported from a position P38*s* to a position P38*e* by changing the position and orientation of the robot 1. An imaging device of the second robot system 4 detects a positional displacement of the workpiece 38 in the hand 5 when the workpiece 38 is gripped by the hand 5.

The controller 2 controls the position and orientation of the robot 1 so as to arrange the workpiece 38 at a predetermined imaging position for detecting the three-dimensional position of the workpiece 38. The image processing unit 51 detects the three-dimensional position of a feature portion of the workpiece 38 based on an image captured by the camera 6. For example, an edge portion of a bottom surface of the workpiece 38 can be detected as a feature portion. The image processing unit 51 detects the position of the workpiece 38. A reference position of the workpiece 38 with respect to the predetermined position and orientation of the robot 1 is stored in the storage part 42. The image processing unit 51 can calculate a displacement in the gripping of the workpiece 38 by the hand 5 based on the reference position of the workpiece 38.

Based on the positional displacement of the workpiece 38 in the hand 5, the operation command generating unit 59 calculates the position and orientation of the robot 1 so as to arrange the workpiece 38 at the desired position P38*e* on the pedestal 98. Then, the operation control unit 43 drives the robot 1 such that the workpiece 38 is arranged at the position P38*e*.

In the second robot system 4, the camera 6 performs focusing when the workpiece 38 is arranged at a predetermined imaging position. The parameter setting unit 53 calculates parameters of the calculation model based on the focus position. The feature position calculating unit 55 calculates the three-dimensional position of the feature portion based on the calculated parameters. Then, the position of the workpiece 38 is detected based on the position of the feature portion.

In the second robot system 4 as well, the imaging position of the workpiece 38 where the workpiece is imaged may be displaced from a desired position. Alternatively, there may be individual differences in the dimensions of the workpiece 38. Even if the camera 6 performs focusing in such a case, the position of the workpiece 38 can be calculated accurately. As a result, the robot system 4 can transport the workpiece 38 to a desired position.

In the second robot system as well, the image processing unit 51 can calculate a second imaging position closer to the camera than a first imaging position after imaging the workpiece at the first imaging position away from the camera and detecting a rough position of the workpiece. Then, a displacement in the gripping of the workpiece 38 may be calculated based on an image captured at the second imaging position. The second robot system may also perform inspections such as dimensional inspection of the workpiece.

Other configurations, actions, and effects of the second robot system are similar to those of the first robot system and thus description thereof will not be repeated here.

Figure 11:
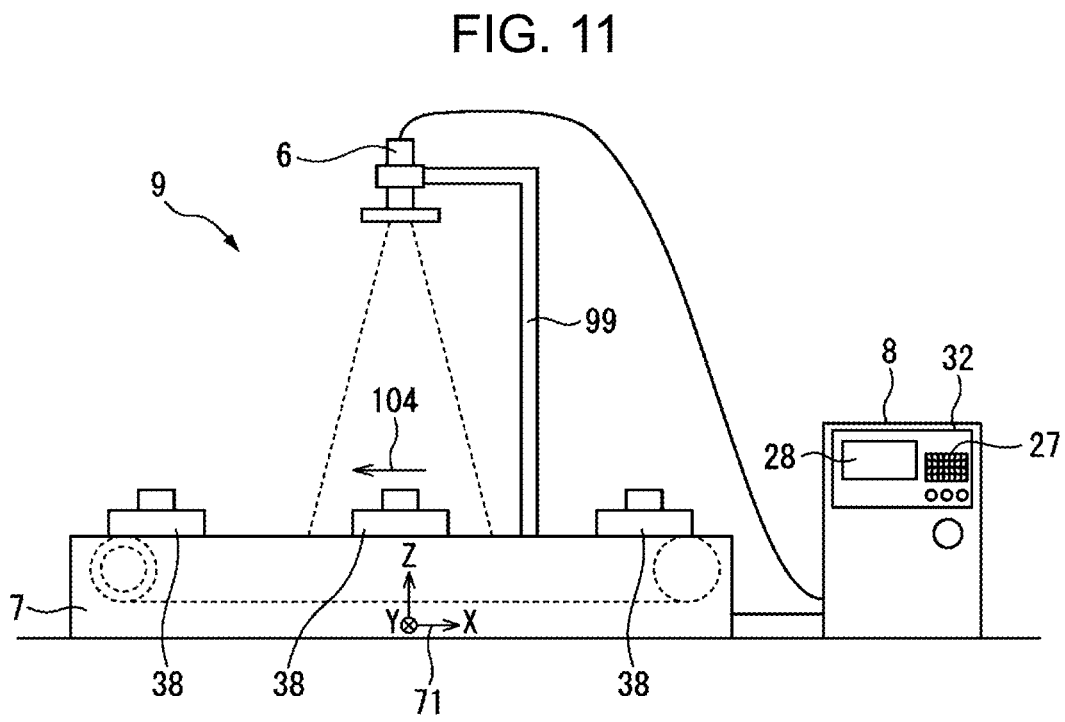
FIG. 11 is a schematic diagram of a transport device according to the embodiment.
Figure 12:
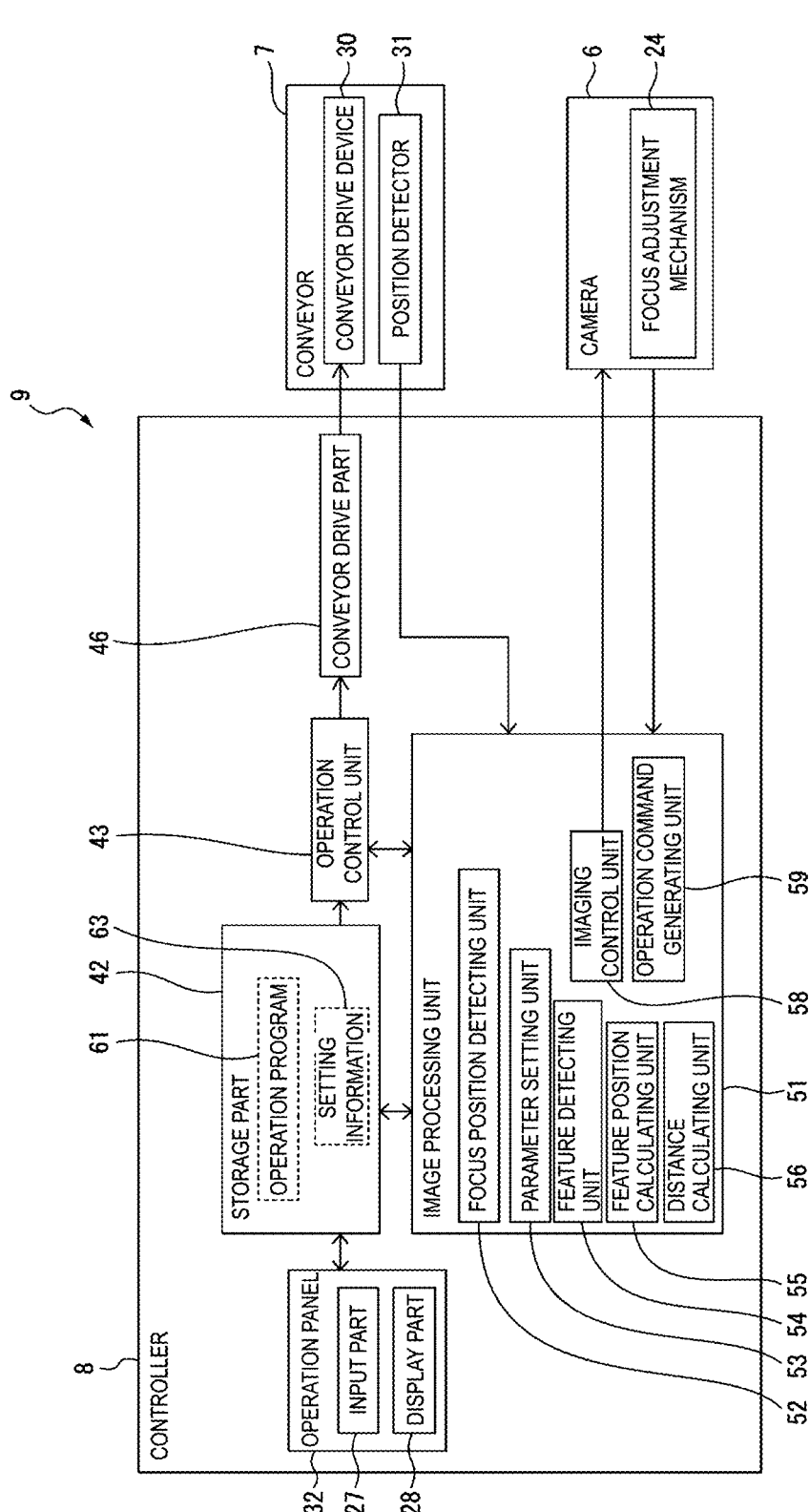
FIG. 12 is a block diagram of a transport device according to the embodiment.

FIG. 11 illustrates a schematic diagram of a transport system according to the present embodiment. FIG. 12 illustrates a block diagram of the transport system according to the present embodiment. Referring to FIG. 11 and FIG. 12, the transport system 9 includes an imaging device that captures an image of a workpiece 38 and detects the workpiece 38. The transport system 9 includes a conveyor 7 serving as a movement device for moving the workpiece 38. The transport system 9 has a configuration in which the conveyor 7 is arranged instead of the robot 1 of the second robot system 4.

The workpiece 38 moves in a direction indicated by an arrow 104 as the conveyor 7 is driven. In other words, the position of the workpiece 38 changes as the conveyor 7 is driven. A camera 6 serving as a vision sensor is supported by a support member 99.

The transport system 9 includes a controller 8 that controls the conveyor 7 and the camera 6. The controller 8 is formed of an arithmetic processing device including a CPU and the like. The controller 8 includes a conveyor drive part 46. The conveyor 7 includes a conveyor drive device 30 including drive motors for driving a belt. A position detector 31 that detects the rotational position of the drive motor is provided for each drive motor. The controller 8 includes an image processing unit 51 that processes an image captured by the camera 6.

The controller 8 includes an operation panel 32. The operation panel 32 includes an input part 27 and a display part 28, similar to the teach pendant 26. The display part 28 can display parameters and the like set by the parameter setting unit 53. Other configurations of the controller 8 are similar to those of the controller 2 of the robot system illustrated in FIG. 2.

In the transport system 9, the camera 6 is fixed at a predetermined position where the workpiece 38 can be imaged. The transport system 9 can detect the position of the workpiece 38 or inspect the workpiece 38 based on the image captured by the camera 6. An imaging position at which the workpiece 38 transported by the conveyor 7 stops may differ. Alternatively, there may be individual differences in the dimensions of the workpiece 38.

In the transport system 9 as well, focusing is performed when the workpiece 38 is imaged. Then, parameters of a calculation model for calculating a three-dimensional position corresponding to a specific position of the image are set based on the focus position. The position of the feature portion of the workpiece 38 is calculated based on the parameters. The position of the workpiece 38 can be calculated or the workpiece 38 can be inspected based on the position of the feature portion of the workpiece 38.

Thus, the position of the camera 6 may be fixed. Also, any device that moves the target object or the camera can be adopted as a movement device. Other configurations, actions, and effects of the transport system are similar to those of the first robot system and the second robot system described above and thus description thereof will not be repeated here.

In each control described above, the order of steps can be changed as appropriate within a range in which the functions and operations are not changed. The above embodiments can be combined as appropriate.

In each of the above figures, the same reference numerals are given to the same or equivalent parts. The above embodiments are examples and do not limit the invention. The embodiments also include modifications of the embodiments indicated in the claims.

REFERENCE SIGNS LIST

1: robot
2: controller
3, 4: robot system
6: camera
7: conveyor
8: controller
9: transport system
24: focus adjustment mechanism
28: display part
37: lens
38: workpiece
38*c*: edge portion
40: controller body
42: storage part
43: operation control unit
51: image processing unit
52: focus position detecting unit
53: parameter setting unit
54: feature detecting unit
55: feature position calculating unit
56: distance calculating unit
59: operation command generating unit
61: operation program
63: setting information
66, 67: image
68*a* and 68*b*: image of hole
69: feature portion

The invention claimed is:

1. An imaging device, comprising:
a vision sensor configured to capture a two-dimensional image of a target object; and
a processor configured to
detect a focus position where the vision sensor is focused;
set a parameter for calculating a three-dimensional position corresponding to a specific position in the two-dimensional image captured by the vision sensor;
store, in a memory, setting information for setting the parameter corresponding to the focus position;

detect a predetermined feature portion in the two-dimensional image of the target object; and
calculate a three-dimensional position of the predetermined feature portion by using the parameter, wherein
the vision sensor is a single two-dimensional camera,
a distance from the target object to the vision sensor is predetermined and maintained at a predetermined value,
the processor is configured to calculate the three-dimensional position of the predetermined feature portion based on the specific position of the predetermined feature portion in the two-dimensional image by using a camera model and the distance from the target object to the vision sensor,
the camera model includes an extrinsic parameter and an intrinsic parameter, and
the processor is configured to calculate the intrinsic parameter included in the camera model based on the focus position and the setting information.

2. The imaging device of claim 1, wherein
the vision sensor has an automatically focusing function.

3. The imaging device of claim 1, wherein
the setting information includes parameters predetermined for a plurality of discrete focus positions, and
the processor is configured to set the parameter for calculating the three-dimensional position based on the parameters determined respectively for a plurality of focus positions stored in the memory.

4. The imaging device of claim 1, further comprising:
a robot configured to move at least one selected from a group of the target object and the vision sensor.

5. The imaging device of claim 4, wherein
the processor is configured to
generate an operation command for the robot so as to change an imaging position of the at least one selected from the group of the target object and the vision sensor, and
calculate a second imaging position based on a three-dimensional position of the target object in an image captured at a first imaging position,
the second imaging position is a position where a distance from the target object to the vision sensor is smaller than the distance of the first imaging position, and
the processor is configured to calculate the three-dimensional position of the predetermined feature portion based on an image captured at the second imaging position.

6. The imaging device of claim 1, further comprising:
a display configured to display a value of the parameter.

7. The imaging device of claim 1, wherein
the processor is configured to calculate the distance from the vision sensor to the target object based on the focus position.

* * * * *